United States Patent [19]
Mehta

[11] Patent Number: 5,346,548
[45] Date of Patent: Sep. 13, 1994

[54] HIGHLY DURABLE CEMENT PRODUCTS CONTAINING SILICEOUS ASHES

[75] Inventor: Povindar K. Mehta, El Cerrito, Calif.

[73] Assignee: The Regents of the University of California, Oakland, Calif.

[21] Appl. No.: 47

[22] Filed: Jan. 4, 1993

Related U.S. Application Data

[63] Continuation-in-part of Ser. No. 917,908, Jul. 21, 1992, abandoned, which is a continuation of Ser. No. 543,262, Jun. 25, 1990, abandoned.

[51] Int. Cl.$^5$ .............................................. C04B 16/02
[52] U.S. Cl. ................... 106/705; 106/707; 106/713; 106/714; 106/745; 106/763; 106/DIG. 1
[58] Field of Search ................. 106/705, DIG. 1, 707, 106/745, 763, 713, 714, 721, 789; C04B 16/02

[56] References Cited

U.S. PATENT DOCUMENTS

| | | |
|---|---|---|
| 3,959,007 | 5/1976 | Pitt. |
| 4,105,459 | 8/1978 | Mehta. |
| 4,210,457 | 7/1980 | Dodson ......................... 106/DIG. 1 |
| 4,659,670 | 4/1987 | Falk ........................................ 501/99 |
| 4,829,107 | 5/1989 | Kindt ..................................... 106/406 |

FOREIGN PATENT DOCUMENTS 2621036 of 1987 France.

OTHER PUBLICATIONS

I. Sacher, "Contributions to the Use of Rice Husks and Rice Husk Ash in Ceramics", *Sprechsaal/International Ceramics & Glass Magazine*, vol. 121, No. 11, pp. 1081–1084 (Nov., 1988).

Chemical Abstracts, vol. 101, No. 18, Oct. 29, 1984, Columbus, Ohio, US; Abstract No. 156582f.

Mehta, P. K., Proc. UNIDO/ESCAP/RCTT Workshop on Rice Husk Ash Cement, Peshawar, Pakistan, 1979, pp. 113–122.

Mehta, P. K., J. Amer. Con. Inst., vol. 74, No. 9, 1977, pp. 440–442, "Properties of Blended Cements Made from Rice Husk Ash".

Mehta, P. K., et al., Living with Marginal Aggregates, ASTM STP 597, 1976, pp. 25–35.

Cook, D. J., et al., Proc. Conference on Hydraulic Cement Pastes, Cement and Concrete Association, London 1976, pp. 268–282.

Chopra, S. K., Proc. UNIDO/ESCAP/RCTT Workshop on Rice Husk Ash Cement, Peshawar, Pakistan, 1979, pp. 135–149.

Al-Khalaf, M. N., et al., J. Cement Composites, vol. 6, 1984, pp. 241–248.

D. Manmohan and P. K. Mehta, "Influence of Pozzolanic, Slag, and Chemical Admixtures on Pore Size Distribution and Permeability of Hardened Cement Pastes", *Cement, Concrete and Aggregates*, Summer 1981.

Hwang, C. L., et al., ACT SP-114, (Editor: V. M. Malhotra), 1989, pp. 733–745.

"Concrete Durability Katherine and Bryant Mather Intl. Conf.", ed. J. M. Scanlon vol. 2, Detroit: American Concrete Institute SP-100 (1987), pp. 1459–1470.

Kosmatka, S. H., and W. C. Panarese, "Design and Control of Concrete Mixtures", 13th ed., Skokie, Ill.: Portland Cement Assoc. (1988), p. 90.

"High-Strength Concrete, Second Intl. Symposium", ed. W. T. Hester, Detroit: American Concrete Institute (1990), pp. 265–267 and 281.

Mehta, P. K., "Concrete Structures, Properties and Materials", New Jersey: Prentice-Hall, Inc. (1986), p. 11.

*Primary Examiner*—Mark L. Bell
*Assistant Examiner*—Paul Marcantoni
*Attorney, Agent, or Firm*—Robbins, Dalgarn, Berliner & Carson

[57] ABSTRACT

Compositions particularly suitable for use in preparation of concrete and mortar products comprising at least one cement and from about 5% to about 30% by weight of the cement of siliceous ash from crop residue, wherein the ash is from about 60% to about 95% by weight silica, at least about 90% of the silica is amorphous, at least about 75% of ash particles are in a size range of from about 4 to about 75 micrometers, and the ash particles have a mean particle diameter measured by laser-light scattering of at least 6 micrometers and a B.E.T. surface area of at least 20 m$^2$/g. The cement employed is a portland cement or a blended portland cement. Concrete and mortar products prepared from these compositions are characterized by exhibiting after 28 days a compressive strength of at least 2500 psi and chloride permeabilities of less than 2000 coulombs when measured in accordance with AASHTO T-277.

17 Claims, 4 Drawing Sheets

PARTICLE SIZE ANALYZER 90/03/22
DISTRIBUTION GRAPH

SAMPLE: G
ID# 90/03/22-17:26-461
MODE: 1
T%: 72.6%

FIG.—1

MEDIAN = 38.57 μm
SP.AREA = 2677 CM$^2$/CM$^3$
% ON DIA: 10.0 μm = 9.6%
DIA ON %: 90.0% = 79.44 μm

DISTRIBUTION TABLE

| SEG. | SIZE (MICRONS) | INTVL % | UNDER SIZE% | SEG. | SIZE (MICRONS) | INTVL % | UNDER SIZE% |
|---|---|---|---|---|---|---|---|
| (01) | 200.0 | 0.2 | 100.0 | (29) | 4.47 | 0.7 | 2.4 |
| (02) | 174.6 | 0.4 | 99.8 | (30) | 3.90 | 0.6 | 1.7 |
| (03) | 152.4 | 0.6 | 99.5 | (31) | 3.41 | 0.4 | 1.1 |
| (04) | 133.1 | 1.1 | 98.8 | (32) | 2.98 | 0.3 | 0.7 |
| (05) | 116.2 | 1.7 | 97.8 | (33) | 2.60 | 0.2 | 0.3 |
| (06) | 101.4 | 2.8 | 96.0 | (34) | 2.27 | 0.1 | 0.1 |
| (07) | 88.58 | 4.0 | 93.2 | (35) | 1.98 | 0.0 | 0.0 |
| (08) | 77.34 | 5.5 | 89.2 | (36) | 1.73 | 0.0 | 0.0 |
| (09) | 67.52 | 7.0 | 83.7 | (37) | 1.51 | 0.0 | 0.0 |
| (10) | 58.95 | 8.2 | 76.7 | (38) | 1.32 | 0.0 | 0.0 |
| (11) | 51.47 | 8.8 | 68.5 | (39) | 1.15 | 0.0 | 0.0 |
| (12) | 44.94 | 8.7 | 59.7 | (40) | 1.00 | 0.0 | 0.0 |
| (13) | 39.23 | 8.1 | 51.0 | (41) | 0.88 | 0.0 | 0.0 |
| (14) | 34.25 | 7.0 | 42.9 | (42) | 0.77 | 0.0 | 0.0 |
| (15) | 29.91 | 5.9 | 35.9 | (43) | 0.67 | 0.0 | 0.0 |
| (16) | 26.11 | 4.8 | 30.0 | (44) | 0.58 | 0.0 | 0.0 |
| (17) | 22.80 | 3.9 | 25.2 | (45) | 0.51 | 0.0 | 0.0 |
| (18) | 19.90 | 3.1 | 21.4 | (46) | 0.45 | 0.0 | 0.0 |
| (19) | 17.38 | 2.6 | 18.2 | (47) | 0.39 | 0.0 | 0.0 |
| (20) | 15.17 | 2.2 | 15.6 | (48) | 0.34 | 0.0 | 0.0 |
| (21) | 13.25 | 1.9 | 13.4 | (49) | 0.30 | 0.0 | 0.0 |
| (22) | 11.56 | 1.7 | 11.5 | (50) | 0.26 | 0.0 | 0.0 |
| (23) | 10.10 | 1.6 | 9.8 | (51) | 0.23 | 0.0 | 0.0 |
| (24) | 8.82 | 1.5 | 8.1 | (52) | 0.20 | 0.0 | 0.0 |
| (25) | 7.70 | 1.3 | 6.6 | (53) | 0.17 | 0.0 | 0.0 |
| (26) | 6.72 | 1.1 | 5.3 | (54) | 0.15 | 0.0 | 0.0 |
| (27) | 5.87 | 0.9 | 4.2 | (55) | 0.13 | 0.0 | 0.0 |
| (28) | 5.12 | 0.9 | 3.3 | (56) | 0.11 | 0.0 | 0.0 |

ELECTRICAL BLOCK DIAGRAM

HIGHLY DURABLE CEMENT PRODUCTS CONTAINING SILICEOUS ASHES

BACKGROUND OF THE INVENTION

This application is a continuation-in-part of Ser. No. 07/917,908 filed Jul. 21, 1992, now abandoned, which in turn is a continuation of Ser. No. 07/543,262 filed Jun. 25, 1990, now abandoned.

The present invention relates to novel anhydrous blends of hydraulic cement and siliceous ash. In addition, the present invention is directed to novel cement, mortar and concrete compositions based on these novel anhydrous blends of cement and siliceous ash. Methods for reducing the permeability of hardened concrete products and for accelerating the early strength of concrete mixtures are also disclosed herein.

It is known that a particular type of ash is obtained from the controlled incineration of certain siliceous crop residues, such as rice hull and rice straw. This ash consists of cellular silica particles in a non-crystalline (amorphous) state. As the crystalline forms of silica, such as cristobalite, tridymite, and quartz, are known to cause lung cancer and other serious respirator diseases, the federal and state agencies for environmental protection are quite concerned that the disposal of rice hull and rice straw by burning should not result in ash which contains a significant amount of crystalline silica. Consequently, industrial furnaces of various designs are being used in cogeneration plants. These plants not only produce rice hull ash (RHA) by burning rice hulls efficiently (i.e., the unburnt carbon in the ash is usually held to less than 10% by weight), but also produce a material containing essentially amorphous or noncrystalline silica.

It is further known to use this type of ash as a pozzolanic material in the preparation of blended hydraulic cements (e.g., U.S. Pat. No. 4,105,459 to the present inventor). A hydraulic cement (hereinafter, "cement") is a dry powder which, upon mixing with water, sets and becomes a hardened solid mass forming a water-resistant product. Hydraulic cements blended with siliceous RHA containing 20 to 30% by weight of portland cement and 70–80% by weight of ash are disclosed in U.S. Pat. No. 4,105,459.

Concrete and mortar products made from RHA slurries of ultra-fine particles (i.e. particles with a median diameter of 1 to 3 micrometers) comprising approximately 7.5% to 15% RHA by weight of the combined weight of the ash and portland cement have been disclosed in, e.g., U.S. Pat. No. 4,829,107 to L. J. Kindt. These compositions were found to have a marked decrease in chloride permeability upon hardening. The Kindt patent also disclosed that compositions containing RHA having a particle median diameter of greater than 4 micrometers did not exhibit low permeability and had a chloride permeability equivalent to mortars and concretes that contained no RHA. Even though only admixtures (i.e., slurries) are discussed and claimed in the Kindt patent, the Kindt patent states that RHA having a median particle diameter of 4 micrometers or less can be used in dry powder form. Due to the high surface charges developed by ultra-fine grinding, however, the powder of the Kindt patent tends to flocculate. Attempts to add such RHA in dry form to a concrete mixture using the standard mixing procedure (ASTM C 192) gave a nonuniform dispersion.

SUMMARY OF THE INVENTION

In accordance with a first aspect of this invention, novel blends of crop residue siliceous ash and cement are provided.

Pursuant to a further aspect of this invention, novel concrete and mortar products having high strength and low or very low permeability to water and chloride ions are provided.

Still a further aspect of this invention is to provide a method for decreasing the water and chloride ion permeability of concrete and mortar compositions.

Yet another aspect of this invention is to provide a method for accelerating the early strength of concrete compositions containing fly ash.

BRIEF DESCRIPTION OF THE DRAWINGS

The invention may be better understood with reference to the accompanying drawings, in which.

DETAILED DESCRIPTION OF THE INVENTION

Figure 1:
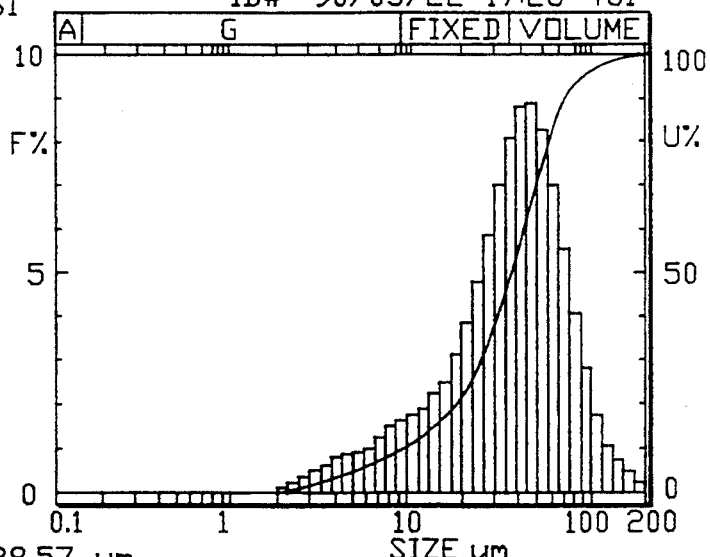
FIG. 1 illustrates data in table and graphical form obtained from the particle size distribution analysis of a sample of ground RHA.

This invention describes the use of a siliceous ash, obtained from the burning of crop residues such as rice hull (also called rice husk), which is used as a mineral addition to cement. According to RILEM Committee 73-SBC Report (Jour. of Structures and Materials, January 1988, p. 89), hereby incorporated by reference in its entirety, the term "mineral addition" is used for inorganic materials, both natural materials and industrial by-products, that are used in quantities of 5% or more by weight of the cement. Mineral additions may be blended or interground with cement, or added directly to compositions comprising cement (e.g., concrete or mortar) before or during mixing.

Pursuant to the present invention, the silicious ash from crop residue used as a mineral addition typically comprises about 60–95% by weight silica. The ash is further characterized in that generally at least about 90% of the silica is amorphous and at least 75% of the ash particles are in the size range of from about 4 to 75 micrometers, preferably from about 10 to about 75 μm. In addition, the ash particles typically have a mean particle diameter measured by laser-light scattering of at least 6 micrometers and a B.E.T. surface area of at least 20 m$^2$/g. The median particle diameter is preferably from about 8 to about 38 micrometers. It is presently preferred with respect to workability and cohesiveness that the median particle diameter be in the range of about 8 to about 15 μm.

The siliceous rice hull ashes used herein are generally of the "highly pozzolanic type", as described in the RILEM 73-SBC Report. According to this report, which is hereby incorporated by reference in its entirety, the controlled incineration of rice hulls produces a cellular product of high surface area with silica mostly in the amorphous state, two factors which are responsible for the high pozzolanicity. However, a rice hull ash which is not completely amorphous, such as RHA No. 3 (in Table 1, below), may also be used in this invention.

Table 1 describes the properties of random samples of RHA obtained from rice-hull-burning furnaces of different designs located in three different states of the U.S. RHA No. 1 and RHA No. 2 contained 4.9 and 5.5% carbon, respectively; RHA No. 3 was found to contain 35% carbon. By X-ray diffraction analysis it was determined that RHA No. 1 and RHA No. 2 contained 100% and 99% silica in the amorphous state, respectively. By quantitative X-ray diffraction analysis, it was estimated that 90% of the silica present in RHA No. 3 is in the amorphous state, the remainder being in the form of cristobalite.

TABLE 1

Characteristics of Rice Hull Ash from Three Different Sources

| | RHA No. 1 (Louisiana) | RHA No. 2 (Texas) | RHA No. 3 (Arkansas) |
|---|---|---|---|
| Chemical Composition | | | |
| $SiO_2$, % | 91.3 | 93.0 | 62.5 |
| $Al_2O_3$ | <0.1 | <0.1 | <0.1 |
| $Fe_2O_3$ | <0.1 | <0.1 | <0.1 |
| CaO | 0.5 | 0.3 | 0.2 |
| $K_2O$ | 2.1 | 0.5 | 1.0 |
| $Na_2O$ | 0.5 | 0.4 | 0.3 |
| Carbon (by ignition loss) | 4.9 | 5.5 | 35.0 |
| Mineralogical Composition of Silica | | | |
| cristobalite, % | U* | 1 | 10 |
| tridymite, % | U* | U* | U* |
| quartz, % | U* | U* | U* |
| amorphous silica (by difference), % | 100 | 99 | 90 |
| Particle Size | | | |
| Particles > 75 $\mu m^+$, % | 75 | 67 | 90 |
| BET Surface area by nitrogen adsorption, $m^2/g$ | 24.3 | 53.0 | 99.2 |

U* undetectable by X-ray diffraction analysis
+% residue on No. 200 mesh standard sieve prior to grinding Table 1 also shows the particle size (i.e., effective diameter) analysis of the three ashes. Although the bulk of particles in each ash are larger than 75 $\mu$m (67 to 90% particles are retained on No. 200 mesh standard sieve), the cellular character of the particles (as illustrated by a typical scanning electron micrograph shown in the U.S. Pat. No. 4,105,459) is evident from the very high B.E.T. surface area values (24.3 to 99.2), as determined by the B.E.T. nitrogen adsorption technique (Monosorb Apparatus, Quantachrome Corp.). All three ashes shown in Table 1 conformed to the silica described in U.S. Pat. No. 4,105,459, which is directed to ashes originating from agricultural matter and containing 49 to 98% silica in highly amorphous form (the balance being mainly residual carbon) and having 10 to 100 $m^2/g$ B.E.T. surface area by nitrogen adsorption.

Figure 2:
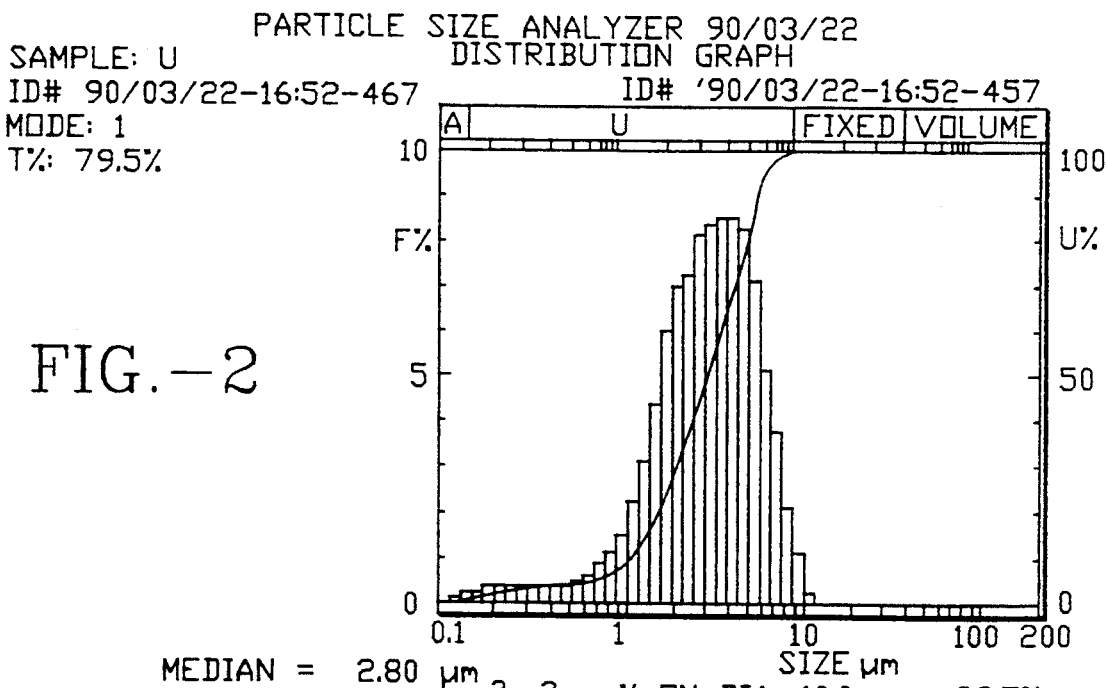
FIG. 2 shows data in table and graphical from obtained from the particle size distribution analysis of a sample of ultra-finely ground RHA.
Figure 4:
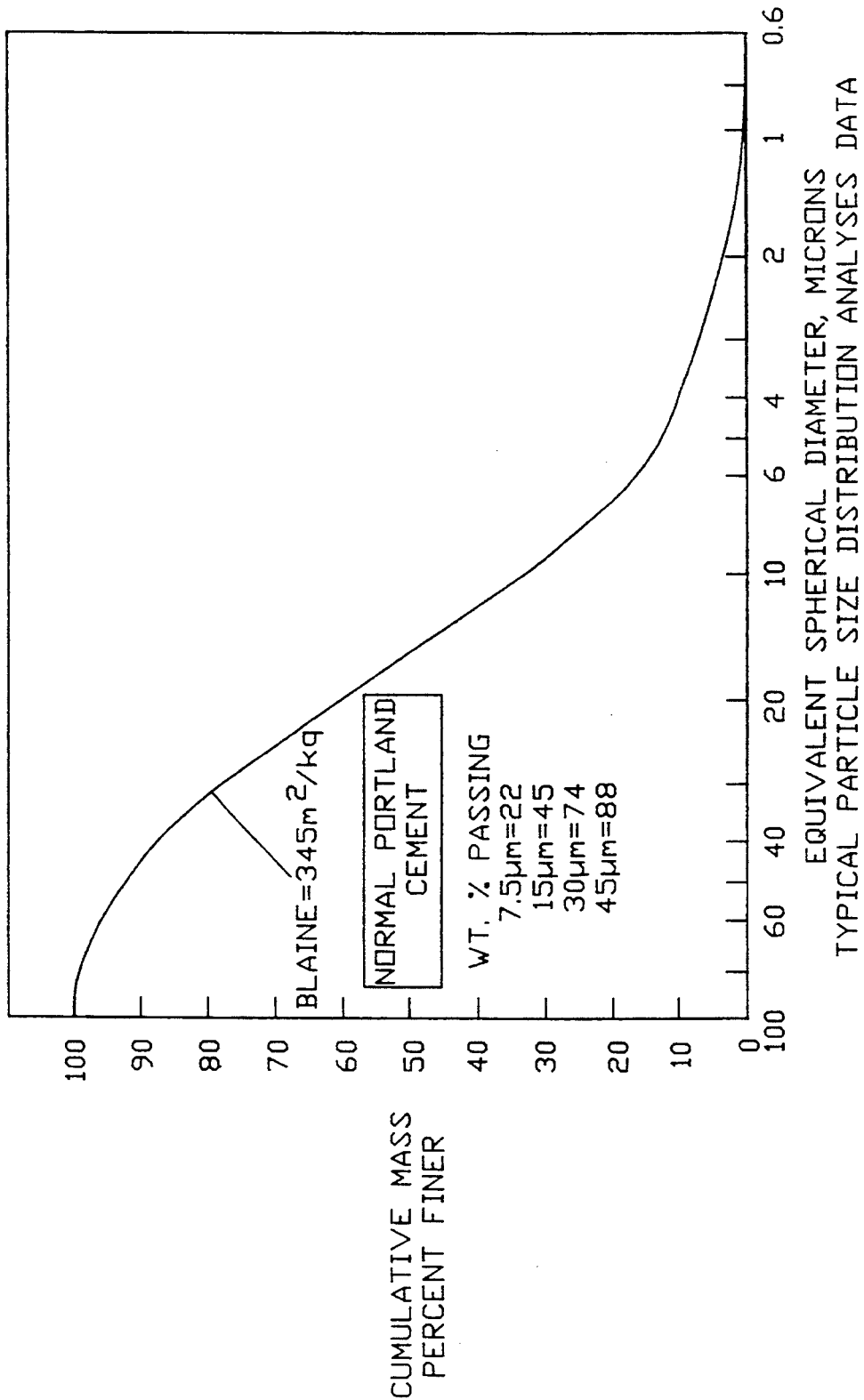
FIG. 4 shows data in graphical form obtained from the particle size distribution analysis of ordinary portland cement (ASTM C 150, Type I portland Cement).

Unless otherwise indicated, the ashes employed in the exemplary formulations described herein were lightly ground such that there was approximately a 10% residue when tested by wet screening on a No. 200 mesh sieve (i.e., after light grinding about 10% of the particles are still larger than 75 $\mu$m, but 90% are smaller than 75 $\mu$m). Typical particle size analysis of the lightly ground sample of RHA No. 1 (also identified as Sample G) is shown in FIG. 1. The data in FIG. 1 show that 89.3% of the particles are less than 77 $\mu$m size and only 9.7% of the particles are below 10 $\mu$m size. This means that 80% of the particles are in the 10–77 $\mu$m size range. The particle size analyses shown in FIGS. 1, 2 and 4 were carried out by the Horiba Apparatus (Model LA-500), using laser-light scattering of a dispersed sample.

Pursuant to a first aspect of the present invention, there is provided a composition comprising at least one hydraulic cement and from about 5–30% by weight, preferably about 10–30% by weight, of said cement of siliceous ash from crop residue as hereinbefore described. For purposes of the present invention, the terms "cement" and "hydraulic cement" refer both to various types of portland cement, and to compositions commonly referred to in the art as blended portland cements (hereinafter, "blended cements"). Any composition comprising a suitable hydraulic cement and siliceous ash from crop residue in the requisite proportions as hereinbefore described is contemplated as within the scope of the present invention.

As is well known in the art, a portland cement is a hydraulic cement produced by pulverizing clinker which predominantly comprises hydraulic calcium silicates, and usually contains one or more of the forms of calcium sulfate as a interground addition. As noted in U.S. Pat. No. 4,105,459, a portland cement will typically comprise about 60 to about 69% by weight of combined and uncombined calcium oxide.

ASTM C 150, *Standard Specification for Portland Cement*, covers 8 types of portland cement, all of which may be employed in accordance with the present invention; ASTM C 150 is hereby incorporated by reference in its entirety. Type I is for use when the special properties specified for any other type are not required; no limits are imposed on any of the four principal compounds. Type IA is air-entrained Type I cement, for use where air entrainment is desired (e.g., for making frost-resistant concrete). Type II is for general use, more especially when moderate sulfate resistance or moderate heat of hydration is desired; since $C_3A$ and $C_3S$ produce high heats of hydration, the specification limits the $C_3A$ content of the cement to maximum 8 percent, and has an optional limit of maximum 58 percent on the sum of $C_3S$ and $C_3A$ (this limit applies when a moderate heat of hydration is required and test data for heat of hydration are not available). Type IIA is air-entraining Type II cement. Type III is for use when high early strength is desired; to ensure that the high strength is not due mainly to the hydration products of $C_3A$, the specification limits the $C_3A$ content of the cement to maximum 15 percent. Type IIIA is air-entraining Type III cement. Type IV is for use when a low heat of hydration is desired; since $C_3A$ and $C_3S$ produce high heats of hydration, but $C_2S$ produces much less heat, the specification calls for maximum limits of 35 and 7 percent on $C_2S$ and $C_3A$, respectively, and requires a minimum of 40 percent $C_2S$ in the cement. Type V is for use when high sulfate resistance is desired; the specification calls for a maximum limit of 5 percent on $C_3A$ which applies when the sulfate expansion test is not required. Types I, II and III are the most commonly used cements, and are particularly preferred in accordance with the present invention.

The chemical and physical characteristics of a normal portland cement meeting the ASTM C 150 requirements for Type I/II portland cement, which was used in the experiments described in this application, are shown in Table 2. Note that Type I/II means that the cement meets the specifications for both ASTM Type I portland cement and Type II portland cement.

TABLE 2

Type I/II Portland Cement, Chemical and Physical Properties

| Chemical Analysis, % | | Physical Properties | |
|---|---|---|---|
| $SiO_2$ | 22.03 | Surface area by Blaine air-permeability method: | 3350 cm²/g |
| $Fe_2O_3$ | 3.67 | | |
| $Al_2O_3$ | 4.03 | | |
| CaO | 65.19 | Specific Gravity | 3.15 |
| MgO | 0.88 | Initial Setting time | 2 h: 19 min |
| $SO_3$ | 2.86 | Final setting time | 4 h: 16 min |
| Ignition Loss | 0.98 | Compressive Strength ASTM C109 Mortar (0.48 w/c, 1:2.75 cement/sand) | |
| Insoluble Residue | 0.16 | | |
| $Na_2O$ | 0.12 | | |
| $K_2O$ | 0.2 | | |
| Total Alkali, as $Na_2O$ | 0.25 | | |
| | | 3 days | 2623 psi |
| | | 7 days | 3711 psi |
| | | 28 days | 5936 psi |

| Compound Composition | Percentage |
|---|---|
| $C_3S$ | 57.5 |
| $C_2S$ | 19.8 |
| $C_3A$ | 4.5 |
| $C_4AF$ | 11.2 |

A wide variety of blended portland cements suitable for use in accordance with the present invention are well known in the art. ASTM C 595, *Standard Specification for Blended Hydraulic Cements*, covers five classes of blended cements; ASTM C 595 is hereby incorporated by reference in its entirety. For purposes of the instant disclosure, a blended cement which would be suitable for use in the novel compositions of the present invention may be characterized as a cement which meets the specifications of ASTM C 595 for Type IS, Type I(SM), Type IP or Type I(PM) cement. A blended cement may be produced by intergrinding portland cement clinker with other materials, blending the components together or both intergrinding and blending them together.

Type I(PM) is a pozzolan-modified portland cement produced either by intergrinding portland cement clinker and pozzolan, or by blending portland cement and finely divided pozzolan, in which the pozzolan content is less than 15% by weight of the pozzolan-modified portland cement composition. Type IP is a portland-pozzolan cement produced either by intergrinding portland Cement clinker and pozzolan or by blending portland cement and finely divided pozzolan, in which the pozzolan constituent comprises about 15–40 weight-% of the portland-pozzolan composition. A pozzolan is defined as a siliceous or siliceous and aluminous material which in itself possesses little or no cementing property but will in a finely divided form and in the presence of moisture chemically react with calcium hydroxide at ordinary temperatures to form compounds possessing cementitious properties.

ASTM C 618, *Standard Specification for Fly Ash and Raw or Calcined Natural Pozzolan for Use as a Mineral Admixture in Portland Cement Concrete*, provides additional details concerning the chemical and physical properties of pozzolans and fly ashes. ASTM C 618 is hereby incorporated by reference in its entirety. The materials comprised within the specifications of ASTM C 618 are divided into three classes. Class N comprises raw or calcined natural pozzolans such as some diatomaceous earths, opaline cherts and shales, tuffs and volcanic ashes or pumicites, and various materials requiring calcination to induce satisfactory properties (such as some clays and shales). Class F comprises fly ash normally produced from burning anthracite or bituminous coal. Class C comprises fly ash normally produced from lignite or subbituminous coal; in addition to having pozzolanic properties, this class of fly ash also has some cementitious properties. For purposes of the present invention, all three classes of materials defined in ASTM C 618 are considered suitable for use in preparation of blended portland cements meeting the requirements of ASTM C 595; therefore, a Type IP or Type I(PM) blended portland cement for purposes of the present invention may comprise Class N, Class F and/or Class C materials in addition to the portland cement.

Notwithstanding the highly pozzolanic character of the RHA, it would not qualify as a pozzolan under ASTM C 618; in particular, RHA does not meet the maximum water requirement standard of ASTM C 618 for pozzolans and fly ashes. Therefore, reference is made to the aforementioned RILEM Committee 73-SBC Report for additional details with respect to classification and characteristics of siliceous by-products used as cement additions or mineral admixtures in concrete.

Type I(SM) cement is an intimate and uniform blend of portland cement and fine granulated blast furnace slag produced by intergrinding portland cement clinker and granulated blast-furnace slag, by blending portland cement and finely ground granulated blast-furnace slag, or a combination of intergrinding and blending in which the slag constituent is less than 25% of the weight of the slag-modified portland cement. Type IS is an intimate and uniform blend of portland cement and fine granulated blast-furnace slag in which the slag constituent is between 25 and 70% of the weight of portland blast-furnace slag cement. Blast-furnace slag is a nonmetallic product consisting essentially of silicates and aluminosilicates of calcium and other bases. Granulated slag is the glassy or non-crystalline product which is formed when molten blast furnace slag is rapidly chilled, as by immersion in water. ASTM C 989, *Standard Specification for Ground Granulated Blast-Furnace Slag for Use in Concrete and Mortars*, provided additional details concerning the chemical and physical properties of blast furnace slags; ASTM C 989 is hereby incorporated by reference in its entirety.

Compared to pozzolans, finely ground granulated blast-furnace slag is self-cementing; that is, it does not require calcium hydroxide to form cementitious products such as C-S-H. However, when granulated blast-furnace slag hydrates by itself, the amount of cementitious products formed and the rates of formation are insufficient for application of the material to structural purposes. When used in combination with portland cement, the hydration of slag is accelerated in the presence of calcium hydroxide and gypsum. During the hydration of Type IS cement, some calcium hydroxide produced by the portland cement is consumed by the slag constituent of the cement.

As previously noted, blended cements are produced either by intergrinding a suitable additive with portland cement clinker or by mixing portland cement with a finely ground additive. Fine grinding of the ash prior to making a blended cement is not necessary for the purpose of increasing the surface area and reactivity; however, a light grinding treatment to pulverize the very large particles (i.e., particles having a median diameter of >75 μm) is thought to be helpful in producing a more homogeneous ash-portland cement blend. This is not necessary for blended cements produced by intergrinding.

Due to the highly pozzolanic character of RHA, in general Type I(PM) cements containing 5-15% pozzolan and Type I(SM) cements containing 5-25% ground granulated blast furnace slag are particularly preferred for use in accordance with the present invention. Type IP cements with relatively low contents of pozzolan (e.g., 15-25%) and Type IS cements with relatively low contents of blast furnace slag (e.g., 25-50%) are preferred relative to Type IP and Type IS cements containing higher contents of pozzolan and blast furnace slag, respectively.

Pursuant to a further aspect of the present invention, the novel compositions described herein comprising cement and siliceous ash from crop residue may suitably be combined with other components to prepare useful materials having valuable properties for a variety of end uses. These materials include, but are not limited to, wet concrete compositions, mortar products, and concrete products. As used herein, the terms wet concrete composition and wet mortar composition refer to any compositions that contain cement, water, and fine and/or coarse aggregate and are capable of setting to become a hardened solid mass. As used herein, a mortar product is a hardened cement product obtained by mixing a cement, a fine aggregate and water. As used herein, a concrete product is a hardened cement product obtained by mixing cement, coarse aggregate, fine aggregate and water.

As is well known in the art, mortar typically contains from about 2 to about 6 parts by weight of fine aggregate (such as sand) per part by weight of anhydrous cement. Sufficient water is then added to the cement/fine aggregate mixture to make it workable and flowable; typically, the weight ratio of water to cement (w/c) is in the range of about 0.4 to about 0.6.

As used herein, a concrete product is a hardened cement product that is obtained by mixing a cement, a coarse aggregate, and water. Typically, the precursor mixture contains a fine aggregate as well. Again as is known generally in the art, wet concrete typically contains about 1 to about 4 parts by weight of fine aggregate and about 1 to about 6 parts by weight of coarse aggregate per part by weight of cement. Water is added to the dry components to provide the desired consistency. For high durability, suitable weight ratios of water to cement (w/c) are typically in the range of about 0.2 to about 0.45; however, for other end uses substantially higher w/c ratios (up to about 0.7) may be employed. Therefore, concrete products in accordance with the present invention are prepared from wet concretes comprising from about 0.2 to about 0.7 parts by weight of water.

As is well known in the art, the strength properties of concrete and mortar products depend to a great extent upon the relative proportions of cement, aggregates and water. For a typical low-strength concrete (e.g., having a strength of about 2650 psi), the following ratios are exemplary: 1 part by weight of cement; 3.13 parts by weight of fine aggregate; 4.58 parts by weight of coarse aggregate; and 0.7 parts by weight of water. For a moderate strength concrete, the following ratios are exemplary: 1 part by weight cement; 2.38 parts by weight of fine aggregate; 2.9 parts by weight of coarse aggregate; and 0.5 parts by weight of water. For a high-strength concrete, the following ratios are exemplary: 1 part by weight of cement; 1.74 parts by weight of fine aggregate; 1.71 parts by weight of coarse aggregate; and 0.34 parts by weight of water. Of coarse, as would be immediately apparent to those skilled in the art, the relative proportions of these components may be varied within the ranges previously specified in order to provide final products having the requisite characteristics for a particular end use.

As previously noted, the novel concrete and mortar products of the present invention include fine and/or coarse aggregate. A crushed limestone aggregate from the San Francisco Bay area ($\frac{1}{2}$ inch maximum size) was used as the coarse aggregate and a quartzitic sand with 3.0 fineness modulus as the fine aggregate for making exemplary concrete mixtures of this invention. Of course, other fine and coarse aggregates as would customarily be employed in mortar and concrete compositions are equally suitable for use in the products of the present invention.

The compositions of the present invention may further suitably comprise at least one superplasticizer. For durability to severe environmental exposure, the American Concrete Institute (ACI Committee 201 on durability) recommends the use of concrete with less than a 0.4 water/cement ratio. Modern construction practice, such as placement of concrete by pumping and the use of highly reinforced structures, requires high consistency of fresh concrete. To this end, a combination of low water/cement ratio and high consistency (about a 6-10 inch slump) is usually achieved by incorporating a superplasticizing admixture (e.g., a Class F Water-reducing High-range composition meeting the ASTM C 494 Standard Specification). A commercially available naphthalene-sulfonate type superplasticizer was used in all concretes described in the examples herein. The superplasticizer was used in the form of a solution in water, containing 40% solids by weight. Of course, other superplasticizers as are well known in the art may alternatively be employed in the compositions of the present invention. Additional information concerning suitable superplasticizers may be found in, e.g., U.S. Pat. No. 5,114,617, the entire disclosure of which is hereby incorporated by reference.

Mix proportions for high-strength superplasticized concrete mixtures were developed for 8-10 inches slump and 9000-11,000 psi strength range (28-day compressive strength). Laboratory tests showed that with the given Type I/II portland cement a maximum water/cement ratio of 0.34 and a minimum cement content of 630 lb/yd$^3$ were needed to achieve approximately 9000 psi compressive strength at 28 days (28-d) using the components employed in the specific formulations described herein. Similarly, a water/cement ratio of 0.28 and a cement content of 780 lb/yd$^3$ were needed to achieve approximately 11,000 psi compressive strength at 28-d with these formulations. Three intermediate mixtures were designed to contain 660, 690, and 720 lb/yd$^3$ cement content, and 0.327, 0.31, and 0.30 water/cement ratio, respectively. The properties of these five portland cement concrete mixtures were compared with corresponding concrete mixtures made with blended portland cements containing 5%, 10%, 15%, 20% and 30% RHA by weight of portland cement, respectively. To determine the effect of RHA addition on the properties of portland cement concrete mixtures, the same quantity of coarse aggregate, fine aggregate and superplasticizer were used in the reference portland cement concretes and the blended RHA/portland cement concretes. The use of adequate dosages of superplasticizer (7.5 liters) made it possible to achieve the desired consistency (6"–10" slump), as can be seen from the properties of the fresh concrete products listed in Table 4.

total charge that is measured over a 6 hour (6-h) period is assumed to be related to the chloride permeability of concrete.

In this test, concretes which permit more than 4,000

TABLE 3

| | Mix Proportions of Concrete, lb/yd$^3$ | | | | | | |
|---|---|---|---|---|---|---|---|
| Mix Description | Portland Cement | RHA | Coarse Aggregate | Fine Aggregate | Super-Plasticizer liters/yd$^3$ | Water* | Water/cement Ratio |
| Test A | | | | | | | |
| reference concrete | 630 | 0 | 1820 | 1325 | 7.5 | 215 | 0.34 |
| 5% RHA by weight of portland cement, or 4.1% RHA by weight of blended cement | 600 | 30 | 1820 | 1325 | 7.5 | 215 | 0.34 |
| Test B | | | | | | | |
| reference concrete | 660 | 0 | 1790 | 1325 | 7.5 | 215 | 0.327 |
| 10% RHA by weight of portland cement, or 9.1% RHA by weight of blended cement | 600 | 60 | 1790 | 1325 | 7.5 | 215 | 0.327 |
| Test C | | | | | | | |
| reference concrete | 690 | 0 | 1760 | 1325 | 7.5 | 215 | 0.31 |
| 15% RHA by weight of portland cement, or 13.4% RHA by weight of blended cement | 600 | 90 | 1760 | 1325 | 7.5 | 215 | 0.31 |
| Test D | | | | | | | |
| reference concrete | 720 | 0 | 1730 | 1325 | 7.5 | 215 | 0.30 |
| 20% RHA by weight of portland cement, or 16.7% RHA by weight of blended cement | 600 | 120 | 1730 | 1325 | 7.5 | 215 | 0.30 |
| Test E | | | | | | | |
| reference concrete | 780 | 0 | 1670 | 1325 | 7.5 | 215 | 0.28 |
| 30% RHA by weight of portland cement, or 23.1% RHA by weight of blended cement | 600 | 180 | 1670 | 1325 | 7.5 | 215 | 0.28 |

*Mixing water plus the water present in the superplasticizer

ASTM Standard test procedures, such as given by ASTM C 192 and C 39, were used for mixing (except for the concrete mixture with RHA-U as described below in Example 7), casting, curing, and testing the properties of concrete mixtures. Cylindrical, 4 by 8 inch, triplicate specimens were used for determination of compressive strength at 3, 7, and 28 days. The 28-day standard-cured, 4 by 8-inch concrete specimens were also used for testing permeability to chloride ions by the AASHTO T-277 method which, as discussed below, is now a commonly used test for evaluating the general durability of concrete to penetration of water and aggressive ions.

Figure 3:
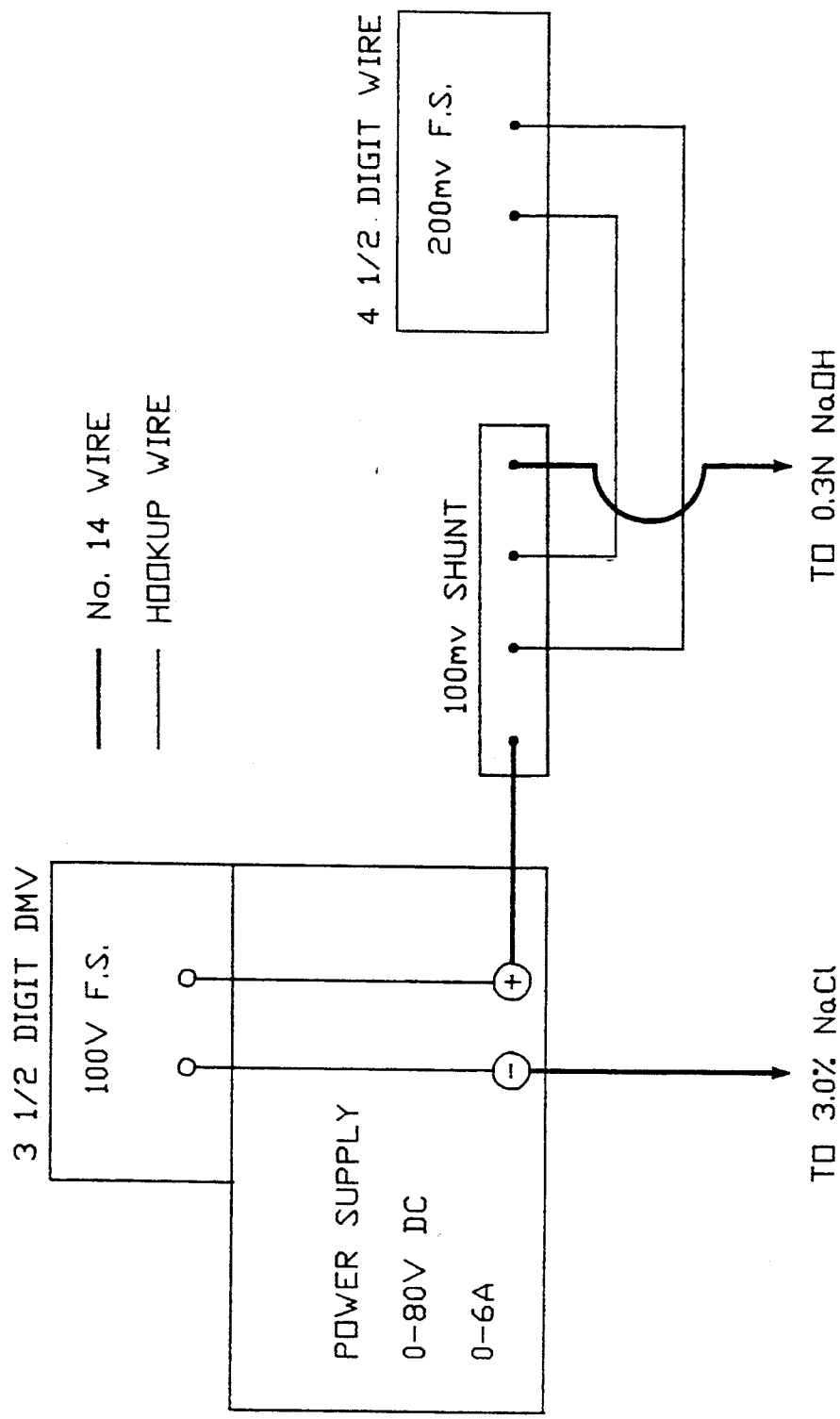
FIG. 3 is a schematic diagram illustrating the standard apparatus used in the chloride permeability test.

It is universally accepted that permeability of concrete to water is the most important property determining the durability against most of the processes of concrete deterioration, such as cracking due to freezing and thawing cycles, sulfate attack, alkali-aggregate attack, and corrosion of reinforcing steel. Many of the tests for water permeability are very cumbersome and time consuming; however, a chloride permeability test, in accordance with the AASHTO T-277 methods, is fairly simple and rapid. There is a high correlation between the results obtained in the chloride permeability test and the results obtained in tests for water permeability (i.e., if a product has decreased permeability to chloride it will also have decreased permeability to water). The AASHTO T-277 test, based on the work of D. Whiting of the Portland Cement Association (Federal Highway Administration, FHWA Report No. RD-81/119, August 1981), involves monitoring of the amount of electrical current passed through a 4-inch diameter×2-inch thick concrete disk. One end of the test specimen is immersed in a 3% NaCl solution (as illustrated in FIG. 3) and the other in a 0.3N NaOH solution. It is possible to accelerate the migration of chloride ions across the specimen by application of 60 volts d.c. potential. The coulombs are rated as highly permeable; those which permit more than 2,000 coulombs but less than 4,000 are rated as moderately permeable; those which permit more than 1,000 coulombs but less than 2,000 are assumed to have low permeability; and those which permit less than 1,000 coulombs are assumed to have very low permeability (Report No. FHWA/RD-81/119, p. 127). Ordinary portland cement concretes exhibit 9,000–12,000 coulombs chloride permeability in the AASHTO T-277 test.

Pursuant to another particular aspect of the present invention, there are provided low and very low permeability mortar and concrete products prepared from compositions comprising, in addition to the cement and siliceous ash mixture hereinbefore described, water and fine and/or coarse aggregate. The low permeability products are defined as having a chloride permeability of less than about 2000 coulombs when tested in a manner as hereinbefore defined by the AASHTO T-277 test; the very low permeability products have a chloride permeability of less than about 1000 coulombs.

The permeability test used in U.S. Pat. No. 4,829,107 was stated to be a modification of the AASHTO T-277 permeability test. Since this patent does not fully explain the test methods employed and the test results disclosed in U.S. Pat. No. 4,829,107 are given in ohms, it is impossible to convert the test results into coulombs to provide an accurate comparison of the permeability test results reported in the patent with the permeability results obtained in the present invention as described below.

Pursuant to further aspects of the present invention, the early strength of a concrete product may be accelerated and/or the permeability of the concrete product reduced by adding to the wet concrete composition an effective amount comprising about 5% to about 30% by weight of the cement of a siliceous ash from crop residue. In particular, the addition of siliceous ash from crop residue in accordance with the present invention is advantageous in compositions comprising Type I (PM) or Type IP blended cements containing pozzolans such as fly ash. These cements are characterized by low strength at early ages (e.g., up to 28 days). Due to the impermeability-improving and early strength acceleration characteristics of RHA used in this invention, RHA clearly has the potential of becoming a valuable material for use in the cement and concrete industries.

The invention may be better understood with reference to the accompanying examples, which are intended for purposes of illustration only and should not be viewed as in any sense limiting the scope of the invention as defined in the claims appended hereto.

EXAMPLES

Using the materials and procedures described above, the properties of the concrete mixtures of Tests A-E (Table 3) are summarized in Table 4. The compressive strength and the permeability test data are average values of triplicate measurements. The properties of fresh concrete and compressive strength of hardened concrete are as expected. For instance, with the addition of 5 to 30% RHA by weight of portland cements in the blended cements, the 3-day and 7-day compressive strengths are not significantly different from the reference concretes; however, the 28-day and 1-year strengths tend to be somewhat higher as a result in part of the pozzolanic reaction of RHA. Totally unexpected was the very steep drop in the coulomb values or the impermeability of 28-day old concrete products containing more than about 5% RHA by weight of portland cement. The first four of the following examples illustrate this point further.

containing 10% RHA was increased by approximately 18%; moreover, the permeability dropped to almost one-third of the reference permeability (from 3,500 to 1,250 coulombs), improving the concrete permeability rating from moderate to low.

EXAMPLE 2

Test C showed that when compared to the reference portland cement concrete, the 28-day compressive strength of the concrete made with the blended cement containing 15% RHA was increased by approximately 20%; moreover, the permeability dropped to almost one-fourth (from 3,260 to 870 coulombs), improving the permeability rating from moderate to very low.

EXAMPLE 3

Test D showed that the 28-day compressive strength of the concrete made with the blended cement containing 20% RHA was increased by approximately 14%; moreover, the permeability dropped to almost one-eighth (from 3,000 to 390 coulombs) which improved the permeability rating from moderate to very low.

EXAMPLE 4

Test E showed that when compared to the reference portland cement concrete, the 28-day compressive strength of the concrete made with the blended cement containing 30% RHA was increased by approximately 2%; moreover, the permeability dropped by almost an order of magnitude (2,900 to 300 coulombs).

The one-year permeability and strength data reported below (Table 5) are indicative of the long-term moisture resistance of concrete products according to Tests B, C and D. Since the trend in the improvement in strength and impermeability is maintained, it is concluded that RHA products are durable under long-term moisture exposure conditions. Note that unlike concrete products

TABLE 4

Properties of Concrete Mixtures with Blended Cements Containing RHA No. 1

| Property | TEST A Ref. Concrete | TEST A Blended Cement Concrete (5%) | TEST B Ref. Concrete | TEST B Blended Cement Concrete (10%) | TEST C Ref. Concrete | TEST C Blended Cement Concrete (15%) | TEST D Ref. Concrete | TEST D Blended Cement Concrete (20%) | TEST E Ref. Concrete | TEST E Blended Cement Concrete (30%) |
|---|---|---|---|---|---|---|---|---|---|---|
| Fresh Concrete | | | | | | | | | | |
| Slump, inches | 7.5 | 9.0 | 8.0 | 9.0 | 9.5 | 7.0 | 9.0 | 8.5 | 8.5 | 9.0 |
| air content, % | 1.5 | 1.5 | 1.0 | 1.5 | 1.0 | 1.5 | 1.5 | 1.5 | 1.5 | 1.0 |
| unit weight, lb/ft$^3$ | 153 | 152 | 154 | 154 | 155 | 154 | 156 | 155 | 155 | 153 |
| Hardened Concrete | | | | | | | | | | |
| Compressive strength, ksi* | | | | | | | | | | |
| 3-day | 5.9 | 6.0 | 6.7 | 6.3 | 7.1 | 6.7 | 7.0 | 6.8 | 7.6 | 6.5 |
| 7-day | 8.2 | 8.1 | 8.4 | 8.4 | 8.9 | 9.0 | 9.3 | 9.7 | 9.7 | 9.0 |
| 28-day | 9.6 | 10.4 | 9.7 | 11.5 | 9.9 | 11.9 | 10.5 | 12.0 | 11.0 | 11.2 |
| 28 day permeability coulombs passed: | 3700 | 3500 | 3500 | 1250 | 3260 | 870 | 3000 | 390 | 2900 | 300 |
| permeability rating (28-day)**: | moderate | moderate | moderate | low | moderate | very low | moderate | very low | moderate | very low |

*According to FHA Report RD 81/119, 1981
**100% relative humidity, 73.4 ± 3° F.

EXAMPLE 1

The results from Test A (Table 4) show that the compressive strength and the chloride permeability of the concrete made from the blended cement containing 5% RHA were somewhat improved in comparison to the reference portland cement concrete. However, Test B showed that when compared to the reference portland cement concrete, the 28-day compressive strength of the concrete made with the blended cement made from less reactive mineral additions (such as pozzolans, fly ash and blast furnace slag), the degree of improvement in strength and impermeability with RHA concretes over the period from 28 days to 365 days is not very high. This has a beneficial aspect because it shows that prolonged curing of RHA concrete products is not necessary to achieve high strength and impermeability.

TABLE 5

1-Year Properties of Concrete Mixtures with Blended Cements Containing RHA No. 1

| | Compressive strength, ksi | 1 year permeability coulombs passed | rating |
|---|---|---|---|
| TEST B | | | |
| ref. concrete | 11.6 | 2200 | moderate |
| blended cement | 12.5 | 420 | very low |
| concrete (5% RHA) | | | |
| TEST C | | | |
| ref. concrete | 11.6 | 2000 | low |
| blended cement concrete (15% RHA) | 13.3 | 250 | very low |
| TEST D | | | |
| ref. concrete | 11.8 | 1800 | low |
| blended cement concrete (20% RHA) | 13.4 | 190 | very low |

EXAMPLE 5

To insure that the marked improvement in the impermeability of concrete resulting from the use of blended cements containing RHA is not limited to the cements containing a unique specimen of RHA (i.e., RHA No. 1), additional tests were conducted with blended cements containing RHA No. 2 and RHA No. 3. For this purpose, it was sufficient to investigate only one of the test mixtures; the concrete mixture used in Test B of Table 3 was employed. Using the materials and mix proportions of Test B (Table 3), two additional concrete mixtures were made (Test F, Table 6) with blended cements containing 10% of either RHA No. 2 or RHA No. 3. In order to obtain a more homogeneous product, all three ashes were lightly ground to approximately 10% residue on No. 200 mesh standard sieve (75 μm); thus, 10% of the particles were larger than 75 μm and 90% were smaller. Properties of concrete made with blended cements containing the three different brands of RHA are compared in Table 6. Table 6 shows that the properties of fresh as well as of hardened concrete, including the permeability, were not significantly affected by the substitution of RHA No. 2 or RHA No. 3 for RHA No. 1. Compared to the reference concrete mixture (3,500 coulombs), which has a moderate permeability rating according to the recommended specifications for the AASHTO test, all three blended cements containing 10% RHA gave a low permeability rating (1,000-2,000 coulombs). Thus, the impermeability-improving benefit in concrete mixtures from the use of blended cements containing low percentages of RHA is not limited to the cements containing RHA No. 1; in fact, this benefit is available for RHA types with a wide range of physical-chemical characteristics including those represented by RHA No. 1, RHA No. 2 and RHA No. 3.

TABLE 6

Comparison of Properties of Concrete With Blended Cements Containing 10% RHA of Different Types

| | Test B | | Test F | |
|---|---|---|---|---|
| PROPERTIES | Reference Concrete Containing Portland Cement | Concrete Containing Blended Cement with RHA No. 1 | Concrete Containing Blended Cement with RHA No. 2 | Concrete Containing Blended Cement with RHA No. 3 |
| Fresh Concrete | | | | |
| slump, inches | 8.0 | 9.0 | 8.0 | 7.5 |
| air content, % | 1.0 | 1.5 | 1.0 | 1.0 |
| unit weight, lb/yd$^3$ | 154 | 154 | 154 | 153 |
| Hardened Concrete | | | | |
| Compressive strength, ksi | | | | |
| 3-day | 6.7 | 6.3 | 6.3 | 5.5 |
| 7-day | 8.4 | 8.4 | 8.7 | 8.6 |
| 28-day | 9.7 | 11.5 | 11.4 | 11.0 |
| 28-day permeability coulombs passed: | 3500 | 1250 | 1150 | 1750 |

EXAMPLE 6

ASTM Class F fly ash is now the most commonly used pozzolanic admixture in the U.S. It is known, however, that ASTM Class F fly ash is much less reactive than amorphous RHA and takes substantially longer curing periods than 28 days to develop high strength and impermeability. This example illustrates how a partial replacement of fly ash with RHA can make a drastic improvement in the impermeability of concrete even at 28-d.

The properties of a reference concrete mixture containing 675 lb/yd$^3$ portland cement, 1500 lb/yd$^3$ fine aggregate, 1600 lb/yd$^3$ coarse aggregate, 3 liters/yd$^3$ superplasticizer, and 237 lb/yd$^3$ water were compared with corresponding mixtures containing a 20% fly ash additive by weight of the cement (i.e., 135 lb/yd$^3$ fly ash), or 10% Class F fly and 10% RHA (67.5 lb each of Class F fly ash and RHA No. 1). The fly ash used in this example met the ASTM C 618 physical and chemical requirements for Class F fly ash. The 28-d compressive strength and permeability test data are as follows:

| Concrete Mixture | Compressive strength, ksi | Permeability, coulombs |
|---|---|---|
| Reference concrete | 8.7 | 2,930 |
| 20% fly ash addition | 8.4 | 2,270 |
| 10% fly ash + 10% RHA | 9.6 | 450 |

The data shows that the use of 20% Class F fly ash alone as an additive in concrete did not result in a significant change in the 28-day compressive strength and permeability of concrete. The concrete permeability rating as per the AASHTO test was "moderately permeable" for both the reference concrete and the concrete containing fly ash without RHA. The addition of 10% fly ash and 10% RHA increased the strength by only 10%; however, it reduced the coulombs passed to approximately one-seventh of the value obtained by the reference concrete and one-fifth of the value obtained by the concrete containing just the fly ash. The very low rating exhibited by the concrete mixture containing 10% fly ash and 10% RHA provides a method for making highly impermeable concretes using fly ash-RHA mixtures containing only 10% RHA. As shown in Table 4, about 15% or more RHA by weight of cement was needed to obtain a very low permeability rating when RHA alone was used.

It should be obvious that the improved properties resulting from the addition of 10% RHA by weight of the portland cement-RHA mixture to a concrete which already contained fly ash as a mineral additive can also be obtained using a blended portland cement as defined by ASTM C595.

EXAMPLE 7

This example illustrates the particle size range of RHA employed in accordance with the present invention. For this test, RHA No. 1 was used in three different particle size ranges:

Sample L: In the as-received condition 75% of particles in the whole sample were above 75 μm and the surface area was 24.3 m$^2$/g by B.E.T. nitrogen adsorption.

Sample G: This was the material produced by lightly grinding Sample L so that 80% of the particles were in the range of 10 to 77 μm and the median particle diameter was 38 μm (See FIG. 1 for a full particle size analysis). The B.E.T. surface area by nitrogen adsorption was 25.5 m$^2$/g, which shows that light grinding had little or almost no effect on the surface area. As stated above, most of the described tests (e.g., Tests A-E) were carried out with this RHA (i.e., lightly ground RHA No. 1).

Sample U: This is ultra-finely ground ash wherein 80% of the particles are in the 1-6 μm range and the median particle diameter is approximately 31 μm (see FIG. 2 for a full particle size analysis). The B.E.T. surface area of the sample by nitrogen adsorption is 26.5 m$^2$/g. This shows again that grinding of RHA has little or no effect on the surface area, as most of the surface resides in the cellular structure of the material. Due to the high surface charges developed by ultra-fine grinding, the powder has a tendency to flocculate. The incorporation of this ash in the form of dry powder into the concrete mixture, using the standard mixing procedure (ASTM C 192), was difficult because the material could not be uniformly dispersed. As a result, the mixing procedure of the concrete structure containing RHA-U was modified as follows. The ash was first dispersed in the form of a slurry, using the mixing water and the superplasticizers specified for use in the concrete mixture. To the slurry, portland cement, fine aggregate, and coarse aggregate were added during the mixing operation.

Concrete mixtures having the mix proportions of Test B (see Table 3) were made with blended cements containing 10% RHA No. 1 of three different particle sizes, L, G, and U. The resulting 28-day compressive strength and permeability test data are shown in Table 7.

TABLE 7

| Concrete Mixture | Comprehensive Strength, ksi | Permeability, coulombs |
| --- | --- | --- |
| Reference concrete | 9.7 | 3,500 |
| 10% RHA-L | 9.9 | 3,300 |
| 10% RHA-G | 11.5 | 1,250 |
| 10% RHA-U | 12.0 | 880 |

The data shows that the use of as-received RHA containing very large particles (e.g., Sample L, where 75% of the particles are greater than 75 μm) did not result in any improvement in blended cement concrete properties such as strength and impermeability. This may be due to lack of a homogeneous distribution of RHA in the concrete mixture. When compared to the reference concrete, the blended cement products containing the lightly-ground RHA (Sample G) and finely-ground RHA (Sample U) showed relatively small increases in the compressive strength (19 and 23%, respectively). However, they showed dramatic improvements in impermeability. For instance, the coulombs passed into the AASHTO T-277 test were reduced to approximately one-third and one-fourth, respectively (i.e., resulting in the permeability rating from moderate to low or very low). It is suspected that a better homogeneity of concrete made from blended cements containing finer particles of RHA is important for reducing the permeability. It is clear from the data, however, that for this purpose ultra-fine grinding of the type represented by Sample U is not necessary. For most practical purposes, a rating of "low permeability" is sufficient for good concrete durability, and the field performance of concretes with 880 and 1250 coulombs chloride permeability is not expected to be very different from each other.

The types of pozzolanic RHA used herein conform to a broad range of physical-chemical characteristics, such as 20-100 m$^2$/g B.E.T. surface area by nitrogen adsorption, up to 35% carbon content, and 60 to 95% silica, of which up to 10% can be crystalline. Since the desired particle size distribution range of RHA in the blended cements described in the tests reported herein is not much different from that of a typical ASTM Type I portland cement (FIG. 4), the size range of RHA particles in an interground portland-RHA cement can be expected to be similar to the portland cement size range shown in FIG. 4. The unique property of concrete products, such as those in Tests B-F (i.e., having low or very low permeability resulting from the incorporation of 10% to 30% RHA in the blended cements), can be achieved from the use of ashes with a broad range of particles as long as most of the particles conform to a particle size distribution in the range of 10 to 75 μm.

EXAMPLE 8

The early strength of concrete mixtures containing fly ash is accelerated by the addition of RHA. ASTM Type I standard portland cement, a quartzitic sand (3.0 fineness modulus), and a crushed limestone with 1/2-in. (12 mm) maximum size were used to make a reference (control) concrete. The pozzolans used in the test mixtures included an ASTM Class F fly ash and an amorphous rice hull ash with 90% silica content, 5% carbon content, and 20 m$^2$/g B.E.T. surface area. The ash had been pulverized to contain less than 10% particles above 75 μm size.

ACI guidelines for proportioning normal-weight concrete mixtures were used to determine the mix proportions for concrete with $f_c=4000$-psi (27 MPa) and a 5–6 in. (125–150 mm slump). The mix proportions for the control mixture (Mix No. 1) are shown in the left-hand column of Table 8. The middle column of Table 8 (Mix No. 2) shows the mix proportions of a test mixture containing 20% fly ash by weight of cement, used as a partial replacement for cement. The right-hand column (Mix No. 3) shows the mix proportion of a mixture containing 10% fly ash and 10% of the pulverized rice hull ash.

TABLE 8

| Material | Mix Proportions of Concrete Mixtures, lb/yd³ | | |
|---|---|---|---|
| | Mix No. 1 | Mix No. 2 | Mix No. 3 |
| cement | 613 | 500 | 500 |
| Fly ash | — | 124 | 62 |
| Rice hull ash | — | — | 62 |
| Coarse Aggregate | 1840 | 1860 | 1880 |
| Fine Aggregate | 1250 | 1239 | 1240 |
| Water | 323 | 305 | 324 |
| Water/cementitious ratio | 0.53 | 0.49 | 0.52 |

All the concrete mixtures showed excellent workability. The water-reducing characteristic of the fly ash is obvious from the fact that compared to the control mix, approximately 6% less water content was needed to obtain a similar slump (6 in. or 150 mm). Probably due to the very high internal surface of the rice hull ash, Mix No. 3 gave a lower slump (5 in. instead of 6 in.) at a water content similar to the reference mix, although this concrete was found to be more cohesive and workable than the reference concrete.

ASTM standard test procedures were used for mixing, casting, and curing concrete. Cylindrical, 4 by 8 in. (100 by 200 mm) specimens were made for testing the uniaxial compressive strength of concrete at test ages 3-, 7-, and 28-days. The compressive strength data, average of triplicate specimens, are shown in Table 9.

TABLE 9

| | Compressive Strength of Concrete Mixtures, ksi | | |
|---|---|---|---|
| Test Age | Mix No. 1 | Mix No. 2 | Mix No. 3 |
| 3-d | 1.72 | 1.31 | 1.51 |
| 7-d | 2.93 | 2.39 | 2.53 |
| 28-d | 4.85 | 4.06 | 4.32 |

Compared to the control, the concrete mixture containing only the fly ash gave approximately 20% lower compressive strength at early ages (3-d, 7-d) than the control. At 28-d the strength difference was somewhat lower (17%) which is indicative of the influence of slow pozzolanic reaction. This is consistent with earlier observations. Compared to Mix No. 2 (containing fly ash only), the compressive strength of concretes containing fly ash and rice hull ash (Mix No. 3) were found to be significantly higher at all test ages. Instead of 17-20% lower strengths with fly ash concretes the strengths of Mix No. 3 concretes were only 10–12% lower than the reference concrete at all test ages. Rice hull ash is therefore effective in making up a portion of the early-age strength loss attributable to the use of fly ash alone as a pozzolan.

EXAMPLE 9

The effects of RHA on the strength and chloride permeability of high water-to-cement ratio concrete mixtures were evaluated. The performance of concrete products prepared with and without RHA was evaluated. The RHA concretes contained 15% RHA addition by weight of cement. The RHA had an average particle size of 9.35 microns and 3.2% carbon. The coarse aggregate was ½" maximum size aggregate crushed limestone; the fine aggregate was a natural sand with 3.0 fineness modulus. Mix designs and test results for concretes with 0.5 w/c and 0.7 w/c ratios are reported in Tables 10 and 11, respectively.

TABLE 10

| | Reference concrete 0.5 w/c | RHA concrete 0.5 w/c |
|---|---|---|
| Mix proportions (lb/yd³) | | |
| Type III cement | 500 | 500 |
| RHA | 0 | 75 |
| Coarse Aggregate | 1704 | 1658 |
| Fine Aggregate | 1704 | 1658 |
| Water | 250 | 250 |
| Properties of fresh concrete | | |
| Unit Weight (lb/ft³) | 150.5 | 151.2 |
| Slump (in.) | 2.0 | 1.5 |
| Air content (%) | 2.7 | 2.5 |
| Properties of Hardened concrete | | |
| 28-day compressive strength (ksi) | 7.0 | 8.57 |
| 28-day permeability (coulombs) | 6860 | 1100 |

TABLE 11

| | Reference concrete 0.7 w/c | RHA concrete 0.7 w/c |
|---|---|---|
| Mix proportions (lb/yd³) | | |
| Type III cement | 400 | 400 |
| RHA | 0 | 60 |
| Coarse Aggregate | 1706 | 1670 |
| Fine Aggregate | 1706 | 1670 |
| Water | 280 | 280 |
| Properties of fresh concrete | | |
| Unit weight (lb/ft³) | 150.3 | 151.0 |
| Slump (in.) | 2.0 | 2.0 |
| Air content (%) | 2.1 | 1.8 |
| Properties of hardened concrete | | |
| 28-day compressive strength (ksi) | 4.04 | 5.92 |
| 28-day permeability (coulombs) | 9910 | 1630 |

The addition of 15% RHA by weight of cement to concrete mixtures with w/c ratios of 0.5 and 0.7 resulted in 20 to 45% increases in the 28-day compressive strength. In addition, in both cases the chloride permeability was dramatically reduced to about 1/6th of the value of the reference concretes. As defined by AASHTO T277 test method and specifications, the permeability was reduced from "high" to "low".

The samples were re-evaluated after 91 days. The results are reported in Table 12.

TABLE 12

| | Compressive Strength (ksi) | | Chloride Permeability (coulombs) | |
|---|---|---|---|---|
| | (without RHA) | (with 15% RHA) | (without RHA) | (with 15% RHA) |
| 0.7 w/c mix (91-day) | 4.36 | 6.76 | 4,360 | 900 |
| 0.5 w/c mix (91-day) | 7.36 | 9.41 | 4,280 | 730 |

What is claimed is:

1. A dry mix composition for preparation of concrete products upon addition of aggregate and water, said composition consisting essentially of:
   at least one cement; and
   from about 5% to about 30% by weight of the cement of siliceous ash from crop residue, wherein the ash is from about 60% to about 95% by weight silica, at least about 90% of the silica is amorphous, at least about 75% of ash particles are in a size range of from about 4 to about 75 micrometers, and the ash particles have a mean particle diameter measured by laser-light scattering of at least 6 micrometers and a B.E.T. surface area of at least 20 m²/g, said composition providing upon addition of water and aggregate a concrete product characterized after 28 days by a compressive strength of at least 2500 psi and a chloride permeability of less than about 2000 coulombs when determined in accordance with AASHTO T-277.

2. A composition according to claim 1, wherein the crop residue is rice hull.

3. A composition according to claim 1, wherein the cement is selected from the group consisting of portland cements and blended portland cements.

4. A composition according to claim 3, wherein the cement is a portland cement selected from the group consisting of Type I, Type II, Type III and Type V portland cement.

5. A composition according to claim 3, wherein the cement is a blended portland cement selected from the group consisting of Type IP, Type I(PM), Type IS and Type I(SM) blended portland cements.

6. A composition according to claim 5, wherein the blended portland cement is a Type I(PM) or a Type IP cement and the cement comprises about 5% to about 25% pozzolan by weight of the portland-pozzolan cement.

7. A composition according to claim 5, wherein the blended portland cement is a Type I(SM) or a Type IS cement and the cement comprises about 5% to about 50% blast furnace slag by weight of the portland-blast furnace slag cement.

8. A composition according to claim 1, wherein the median particle diameter of the ash particles is from about 8 to about 38 micrometers.

9. A composition according to claim 8, wherein the median particle diameter is about 8 to about 15 micrometers.

10. A composition according to claim 1, comprising about 10% to about 30% of silicious ash from crop residue by weight of cement.

11. A wet concrete composition comprising:
    1 part by weight of cement;
    about 0.05 to about 0.30 parts by weight of siliceous ash from crop residue, wherein the ash is from about 60% to about 95% by weight silica, at least about 90% of the silica is amorphous, at least about 75% of ash particles are in a size range of from about 4 to about 75 micrometers, and the ash particles have a mean particle diameter measured by laser-light scattering of at least 6 micrometers and a B.E.T. surface area of at least 20 m²/g;
    about 1 to about 4 parts by weight of fine aggregate;
    about 1 to about 6 parts by weight of coarse aggregate; and
    about 0.2 to about 0.7 parts by weight of water, for a total of about 3.25 parts to about 12 parts by weight which provides a concrete product characterized after 28 days by a compressive strength of at least 2500 psi and a chloride permeability of less than about 2000 coulombs when determined in accordance with AASHTO T-277.

12. A concrete product prepared from a wet concrete composition according to claim 11.

13. A concrete product according to claim 12, characterized by a chloride permeability of less than about 1000 coulombs.

14. In a method for preparing a concrete product from a wet concrete composition comprising mixing a cement, water, and aggregate to form the wet concrete composition and curing the wet concrete composition to form the concrete product, the improvement comprising adding to the wet concrete composition from about 5% to about 30% by weight of the cement of siliceous ash from crop residue, wherein the ash is from about 60% to about 95% by weight silica, at least about 90% of the silica is amorphous, at least about 75% of ash particles are in a size range of from about 4 to about 75 micrometers, and the ash particles have a mean particle diameter measured by laser-light scattering of at least 6 micrometers and a B.E.T. surface area of at least 20 m²/g, thereby providing a concrete product characterized after 28 days by a compressive strength of at least 2500 psi and a chloride permeability of less than about 2000 coulombs when determined in accordance with AASHTO T-277.

15. A method according to claim 14, wherein the siliceous ash from crop residue is added in an amount of from about 10% to about 30% by weight of the cement.

16. A method for accelerating early strength of a concrete product prepared from a wet concrete composition comprising a cement, the method comprising adding to the wet concrete composition from about 5% to about 30% by weight of the cement of siliceous ash from crop residue, wherein the ash is from about 60% to about 95% by weight silica, at least about 90% of the silica is amorphous, at least about 75% of ash particles are in a size range of from about 4 to about 75 micrometers, and the ash particles have a mean particle diameter measured by laser-light scattering of at least 6 micrometers and a B.E.T. surface area of at least 20 m²/g, thereby providing a concrete product characterized after 28 days by a compressive strength of at least 2500 psi and a chloride permeability of less than about 2000 coulombs when determined in accordance with AASHTO T-277.

17. A method according to claim 16, wherein the siliceous ash from crop residue is added in an amount of from about 10% to about 30% by weight of the cement.

* * * * *